United States Patent
Hwang et al.

(10) Patent No.: US 7,172,798 B2
(45) Date of Patent: *Feb. 6, 2007

(54) HIGH DENSITY READ ONLY OPTICAL DISC

(75) Inventors: In-oh Hwang, Yongin-si (KR); Joo-ho Kim, Suwon-si (KR); Hyun-ki Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/954,362

(22) Filed: Oct. 1, 2004

(65) Prior Publication Data

US 2005/0106351 A1    May 19, 2005

(30) Foreign Application Priority Data

Oct. 2, 2003    (KR)    ............ 10-2003-0068611

(51) Int. Cl.
*B32B 3/02*    (2006.01)

(52) U.S. Cl. ............... 428/64.4; 428/64.5; 428/64.6; 430/270.11

(58) Field of Classification Search ............ None
See application file for complete search history.

(56) References Cited

U.S. PATENT DOCUMENTS

| | | | |
|---|---|---|---|
| 6,312,780 B1 * | 11/2001 | Kasami et al. | 428/64.1 |
| 6,741,549 B2 * | 5/2004 | Tominaga et al. | 369/285 |
| 6,848,115 B2 * | 1/2005 | Sugiura et al. | 720/719 |
| 6,896,946 B2 * | 5/2005 | Chen | 428/64.1 |
| 2002/0154596 A1 | 10/2002 | Hsu et al. | |
| 2002/0160306 A1 * | 10/2002 | Hanaoka et al. | 430/270.13 |
| 2002/0191527 A1 | 12/2002 | Kikukawa et al. | |
| 2004/0257968 A1 * | 12/2004 | Kim et al. | 369/275.2 |
| 2005/0009260 A1 * | 1/2005 | Kim et al. | 438/202 |
| 2005/0079313 A1 * | 4/2005 | Kim et al. | 428/64.4 |

FOREIGN PATENT DOCUMENTS

| | | |
|---|---|---|
| JP | 2000-285536 | 10/2000 |
| JP | 2002-074666 | 3/2002 |

\* cited by examiner

*Primary Examiner*—Bruce H. Hess
(74) *Attorney, Agent, or Firm*—Stein, McEwen & Bui, LLP

(57) ABSTRACT

A high density read only optical disc is provided. The high density read only optical disc includes a substrate having pits formed thereon; a crystalline reading assist layer; a first dielectric layer; and a mask layer composed of a metal oxide. The high density read only optical disc does not require a laser with a short wavelength or a large numerical aperture of an objective lens.

28 Claims, 4 Drawing Sheets

HIGH DENSITY READ ONLY OPTICAL DISC

CROSS-REFERENCE TO RELATED APPLICATION

This application claims the benefit of Korean Patent Application No. 2003-68611, filed on Oct. 2, 2003, in the Korean Intellectual Property Office, the disclosure of which is incorporated herein in its entirety by reference.

BACKGROUND OF THE INVENTION

1. Field of the Invention

The present invention relates to an optical disc, and more particularly, to a high density read only optical disc that allows reading of marks (pits) having a size not greater than a reading resolution limit of a laser beam by using a super-resolution near-field structure placed inside the disc.

2. Description of the Related Art

According to the characteristics of discs, optical discs are classified into read only memory (ROM) optical discs that allow only reading of information recorded thereon, write once read many (WORM) or recordable optical discs that allow information to be recorded thereon only once, and erasable or rewritable optical discs that allow information to be erased and re-recorded thereon.

A compact disc recordable (CD-R) is an example of the WORM optical disc. The CD-R includes a recording layer comprising an organic dye such as cyanine, phthalocyanine, /or the like. A recording laser with a wavelength of 780 nm is irradiated onto the recording layer to decompose the dye layer, and a recorded signal may be read with a power of 1 mW or lower. The CD-R has a recording capacity of about 650 MB and is widely used for recording and reading various types of data such as text data, music, images, and/or the like.

However, optical recording media such as the CD-R, or a compact disc rewritable (CD-RW) using a recording laser beam with a wavelength of 780 nm, have insufficient capacity to store dynamic images, and thus cannot be used in a complex multimedia environment.

To resolve the above problems, digital versatile discs (DVDs) having a capacity of 2.6–4.7 GB by using laser beams with a short wavelength of 630–680 nm have been developed. The DVDs are also classified into readable only DVD (DVD), write once read many DVD (DVD-R), and erasable DVD (DVD-RAM, DVD+RW, DVD-RW). Regarding the DVD-R, a recording laser beam is irradiated onto a recording layer to transform and decompose the recording layer, thus recording data. Regarding the DVD-RAM and DVD-RW, a change of the optical characteristic is caused by a change of phase, thus recording data. Since the DVD-R using an organic dye is more advantageous than other media in terms of compatibility with a DVD-ROM, price, and capacity, research is concentrated on developing the DVD-R.

Regarding many media developed recently, the biggest issue is capacity and various methods to increase the capacity are being researched. Information recorded on the read only optical disc is previously formed on a substrate as pits. Upon reading the information, a laser beam is irradiated onto the optical disc by a reading apparatus, and strength and weakness of reflected beam by the pits is measured using a photodetector. For example, when there is a pit, the reflected beam is weak, and when there is no pit, the reflected beam is strong. The amount of information capable of being recorded on the read only optical disc predominantly depends on how many accurately readable and small pits are formed in a fixed area and characteristics of a laser beam capable of accurately reading the pits. Although light emitted from the laser diode is focused through an objective lens, the light is not collected to one infinitely small point due to the effect of diffraction and forms a beam having a finite width, which is called the diffraction limit. In the case of general optical discs, when the wavelength of a light source is $\lambda$, and the numerical aperture of the objective lens is NA, $\lambda/4NA$ represents a reading resolution limit. Thus, as the wavelength of light source shortens, or the numerical aperture of the objective lens increases, the recording capacity increases. However, current laser technologies cannot provide lasers with a short wavelength, and the cost of manufacturing an objective lens with an increased numerical aperture is high. Further, since as the numerical aperture of an objective lens increases, the working distance between the pickup and the disc considerably shortens, the surface of the disc may be damaged due to collision of the pickup with the disc. As a result, data may be lost.

In the case of a red laser, which is generally used in the art, since a wavelength is 635 nm and NA is 0.6, the reading resolution limit is 265 nm.

FIG. 1 is a graph illustrating the relationship between a length of a pit and carrier to a noise ratio (CNR) in a conventional read only disc having a reflective silver layer formed on a substrate. As is apparent from FIG. 1, when the pit length is not less than 300 nm, the CNR is not less than 40 dB, and information recorded as pits is smoothly read. However, when the pit length is less than 300 nm, the CNR sharply decreases, and when the pit length is not greater than 250 nm, the CNR is close to 0.

To overcome the reading resolution limit, an optical disc having the super-resolution near-field structure (hereinafter referred to "super-resolution structure") has recently been researched. Regarding the super-resolution structure, a special mask layer is formed in an optical disc, and when reading information, the surface plasmon generated in the mask layer is used. For example, in the case of an optical disc having a mask layer of silver oxide, the silver oxide is decomposed into silver and oxygen, and the decomposed silver generates the surface plasmon. Near field reading is possible by the surface plasmon, and the reading resolution limit problem is overcome, so that a very small recording mark may be read.

FIG. 2 schematically illustrates a structure and a recording principle of the conventional recordable optical disc 100 having the mask layer 11 made of silver oxide. As shown in FIG. 2, the recordable optical disc 100 includes a dielectric layer 14 comprising, for example, ZnS—SiO$_2$, the mask layer 11 comprising, for example, AgO$_x$, wherein x is a positive number, a dielectric layer 14 comprising, for example, ZnS—SiO$_2$, a recording layer 12 comprising, for example, GeSbTe, a dielectric layer 14 comprising, for example, ZnS—SiO$_2$, and a reflective layer 13, which are sequentially stacked upon one another on a substrate 10.

A laser beam with a power of about 10–15 mW is irradiated onto a recording layer 12 to record information. In this case, silver oxide is decomposed into fine metal particles and oxygen. Upon reading, plasmon is formed on a surface of the fine silver particle. However, since information is recorded on the substrate 10 in the form of a pit without the recording process in case of a read only optical disc, the decomposition of the silver oxide into silver particles and oxygen does not occur. Thus, it is difficult to select a structure and a material of a disc that facilitates recording on the read only optical disc using only a laser beam with low power as effectively as a disc having the super-resolution structure.

SUMMARY OF THE INVENTION

The present invention provides a high density read only optical disc that records information as effectively as a disc having the super-resolution structure.

The present invention also provides a method of reading information recorded on the high density read only optical disc.

The present invention also provides an apparatus to read information recorded on the high density read only optical disc.

According to an aspect of the present invention, a high density read only optical disc includes: a substrate having pits formed thereon; a crystalline reading assist layer; a first dielectric layer; and a mask layer comprising a metal oxide.

According to another aspect of the present invention, a method reads information recorded on the high density read only optical disc by a plasmon induced super-resolution structure.

According to another aspect of the present invention, an apparatus reads information recorded on the high density read only optical disc by a plasmon induced super-resolution structure.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE EMBODIMENTS

Figure 1:
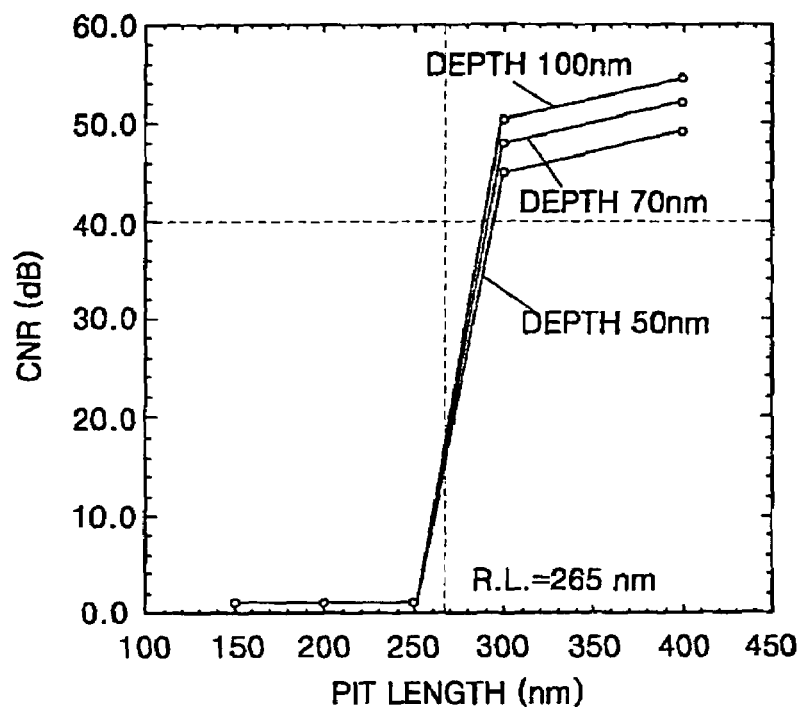
FIG. 1 is a graph illustrating a relationship between a pit length and carrier to noise ratio (CNR) in a conventional read only optical disc.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
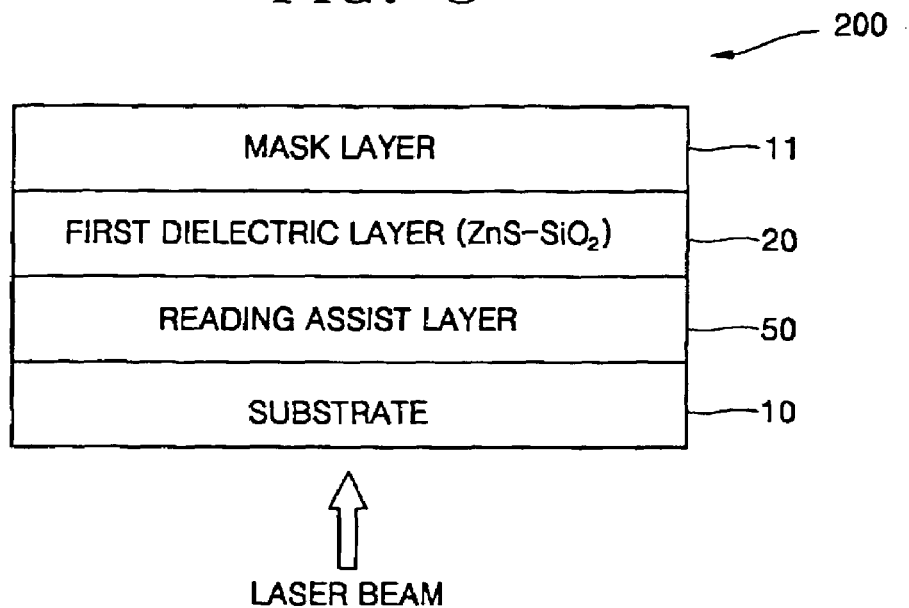
FIG. 3 is a schematic diagram of structure of an optical disc according to Example 1 of the present invention.

FIG. 3 illustrates an optical disc 200 according to an embodiment of the present invention in which a crystalline reading assist layer 50, a first dielectric layer 20, and a mask layer 11 are sequentially formed on a transparent substrate 10 having pits formed thereon.

The substrate 10 comprises a material selected from materials having a high transparency in a wavelength range of the recording laser, an effective impact resistance, heat resistance, environmental resistance, and the like, and capable of being molded by a conventional method of preparing a substrate, such as injection molding. Examples of such a material include polycarbonate, polymethylmethacrylate, epoxy, polyester, amorphous polyolefin, and the like.

The crystalline reading assist layer 50 is formed to enhance the effect of the super-resolution structure while providing high reflectivity upon reading information, and is crystalline directly after being formed as a thin film. As described above, since the mask layer 11 used in the optical disc comprises a metal oxide to obtain the effect of the super-resolution structure by forming surface plasmons; the metal oxide is required to be decomposable into fine metal particles and oxygen. Since a power of a laser used during a reading process has insufficient energy to decompose the metal oxide, the surface plasmons may not be formed. However, a slight amount of metal particles in a reduced form may be contained in the mask layer 11, and the reduced metal particles function as a source of the surface plasmons. At this time, the reading assist layer 50 may enhance the effect of the super-resolution structure of the mask layer 11.

Since the mask layer 11 is a metal oxide, the reflectivity of the mask layer is low. Thus, the reading assist layer 50 also functions as a reflective layer. Meanwhile, the reading assist layer 50 is crystalline to eliminate a process of crystallizing in an initial stage. In other words, since Ge—Sb—Te and Ag—In—Sb—Te alloys which may be generally used as the reflective layer or the reading assist layer are amorphous immediately after being formed as a film, the alloys are crystallized by the reading laser during the first reading, and thus, reflectivity during the first reading is different from the reflectivity during the second reading. To resolve this problem, an initialization process in which the amorphous layer is converted to a crystalline layer immediately after manufacturing the disc is required, which requires further additional costs and processes. However, when using the reading assist layer in a crystalline state immediately after being formed, as in the present invention, the initialization process may be omitted. A material which may be used for the crystalline reading assist layer is not particularly restricted, and examples thereof include Sb as a single element or a material prepared by mixing Te with at least one element selected from Sb, Sn, Pb, Bi, Ge, and As. Sb or $Sb_2Te_3$ may generally be used in the present invention. The reading assist layer may be generally formed to a thickness of 5–50 nm by a method such as vacuum deposition, electron beam, or sputtering so as to assure sufficient reflectivity and reliability.

The metal oxide used for the mask layer 11 is $PtO_x$, $PdO_x$, $AuO_x$, $AgO_x$, or a mixture thereof, wherein x is a positive number, wherein a preferable range of the positive number is approximately 0.1 to 2.5, inclusive. The mask layer is formed by, for example, sputtering. When forming the mask layer using $PtO_x$, argon and oxygen are injected into a vacuum container, and platinum is sputtered as a target, thus forming the mask layer, of which a thickness may be 1.5–10.0 nm.

Figure 4:
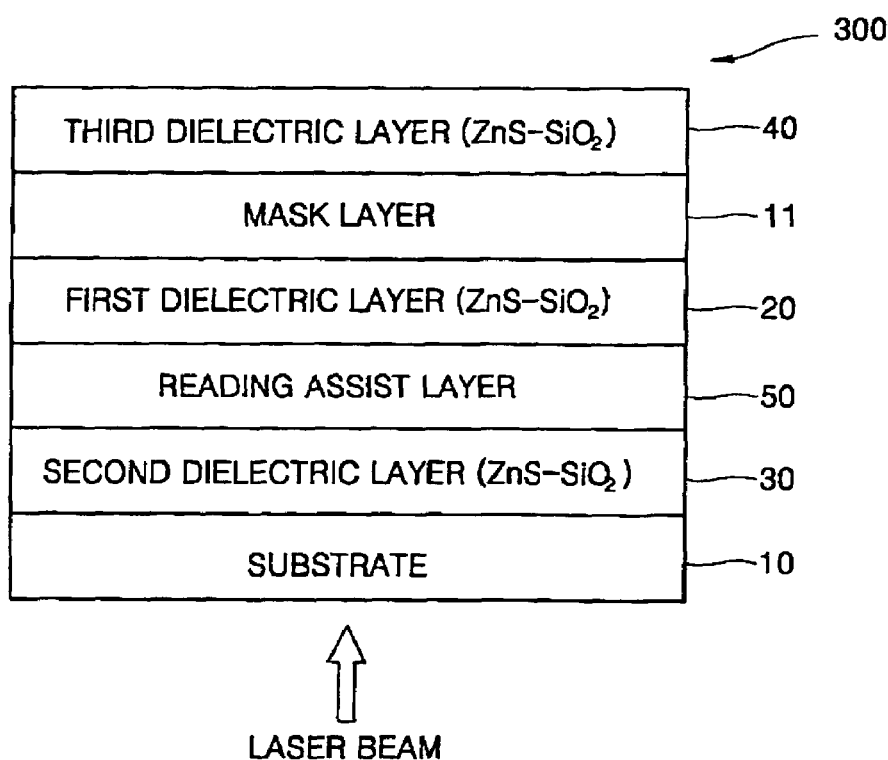
FIG. 4 is a schematic diagram of structure of an optical disc according to Example 4 of the present invention.

In the optical disc according to an embodiment of the present invention, a first dielectric layer 14 acting as a diffusion preventing layer is formed between the reading assist layer 50 and the mask layer 11. Meanwhile, the optical disc according to an embodiment of the present invention may further include a second dielectric layer 30 between the reading assist layer 50 and the substrate 10, and may further include a third dielectric layer 40 on the mask layer 11. The second dielectric layer 30 prevents damage of the substrate 10 due to heat and the third dielectric layer 40 protects the mask layer 11. FIG. 4 is a schematic diagram of structure of an optical disc 300 according to Example 4 of the present invention.

A material of the dielectric layer is $ZnS$—$SiO_2$, $SiO_x$, $SiN_x$, $AlO_x$, or $AlN_x$, wherein x is a positive number.

A method of reading information recorded on the high density read only optical disc according to another embodiment of the present invention includes irradiating a laser beam with an appropriate power onto the disc to form surface plasmons on the super-resolution structure to read reading information recorded thereon.

An apparatus to read information recorded on the high density read only optical disc according to another embodiment of the present invention is not restricted with respect to information recorded and may be read through the effect of the super-resolution structure.

The present invention will be described in greater detail with reference to the following examples. The following examples are for illustrative purposes, and are not intended to limit the scope of the invention.

EXAMPLE 1

Sb was sputtered to form a thin layer with a thickness of 30 nm as a crystalline reading assist layer on a polycarbonate (PC) substrate with a thickness of 0.6 mm, the PC substrate having a track pitch identical with a track pitch of a DVD of 0.74 μm and having pits formed thereon. Then, a $ZnS$—$SiO_2$ layer was formed as a first dielectric layer on the crystalline reading assist layer through sputtering. Next, argon and oxygen were injected into a vacuum container, and Pt was sputtered as a target to form a $PtO_x$ mask layer with a thickness of 3.5 nm. At this time, the flow rate of argon was 15 sccm, the flow rate of oxygen was 9 sccm, and the depositing pressure was 3.8 mTorr.

EXAMPLE 2

A read only optical disc was prepared in the same manner as in Example 1, except that a $Sb_2Te_3$ layer was used as the reading assist layer.

EXAMPLE 3

A read only optical disc was prepared in the same manner as in Example 1, except that a $ZnS$—$SiO_2$ layer with a thickness of 25 nm was further formed between the substrate and the reading assist layer.

EXAMPLE 4

A read only optical disc was prepared in the same manner as in Example 3, except that a $ZnS$—$SiO_2$ layer with a thickness of 50 nm was further formed on the mask layer.

COMPARATIVE EXAMPLE 1

An Ag layer was formed as a reflective layer through sputtering on a polycarbonate (PC) substrate with a track pitch of 0.74 μm and a thickness of 0.6 mm, and having pits formed thereon, thus preparing a read only optical disc having no mask layer.

COMPARATIVE EXAMPLE 2

A dielectric layer with a thickness of 25 nm and a mask layer with a thickness of 3.5 nm were sequentially formed on a polycarbonate (PC) substrate with a track pitch of 0.74 μm and a thickness of 0.6 mm, and having pits formed thereon, thus preparing a read only optical disc having no reading assist layer.

EXPERIMENTAL EXAMPLE 1

Figure 5:
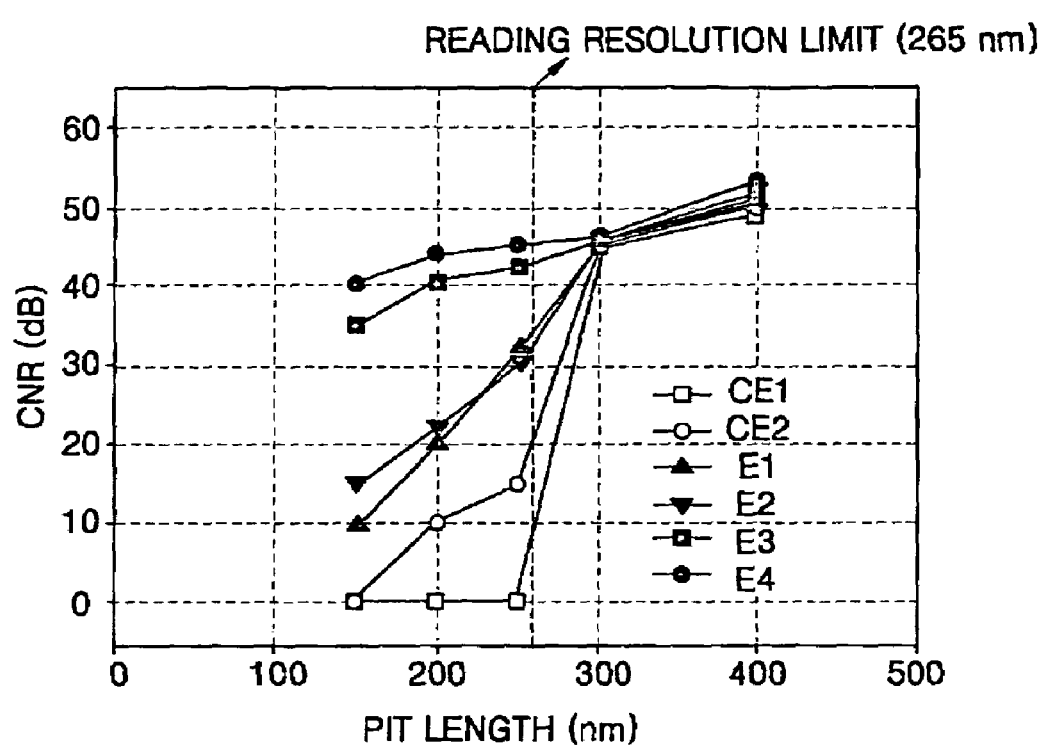
FIG. 5 a graph illustrating evaluation results for the performances of optical discs obtained in Examples 1 through 4 of the present invention and Comparative Examples 1 and 2.

Performances of discs obtained in Examples 1 through 4 and Comparative Examples 1 and 2 were evaluated on a DVD evaluation apparatus having a laser with a wavelength of 635 nm and a pickup with NA of 0.60. A line speed was 3 m/s and a reading power was 3 mW. The obtained result is shown in FIG. 5. In FIG. 5, E denotes Example and CE denote Comparative Example. The reading resolution limit (λ/4NA) was 265 nm, and a minimum pit length in the DVD was 400 nm. In the optical disc prepared in Comparative Example 1, CNR was not obtained at pit lengths of 250 nm and 200 nm, which were less than the reading resolution, i.e. 265 nm. In the case of Comparative Example 2, a CNR of 15 dB or less was obtained. Meanwhile, in Examples 1 through 4 of the present invention, a CNR of about 30 dB or greater was obtained at a pit length of 250 nm. In Examples 3 and 4, a CNR of about 40 dB or greater, which was a level for practical use, was obtained.

Figure 6:
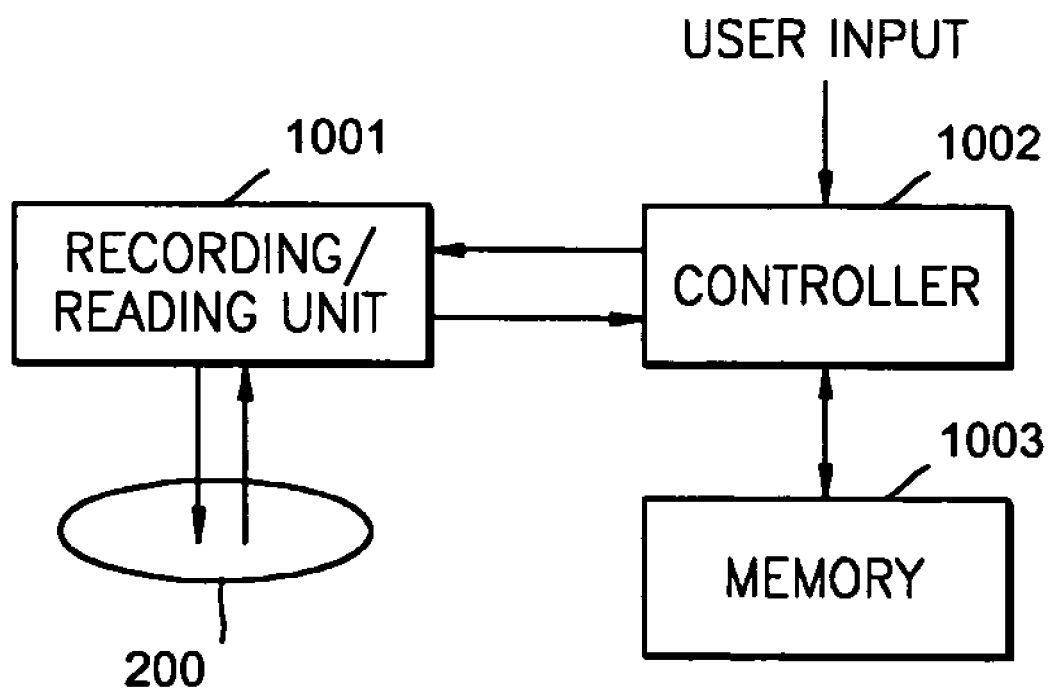
FIG. 6 is a block diagram of a recording and/or reproducing apparatus according to an embodiment of the present invention.

FIG. 6 is a block diagram of a recording and/or reproducing apparatus according to an embodiment of the present invention. Referring to FIG. 6, the recording and/or reproducing apparatus includes a recording/reading unit 1001, a controller 1002, and a memory 1003. The recording/reading unit 1001 transfers data with respect to disc 200 or 300, which are embodiments of an information storage medium of the present invention. The controller 1002 reproduces data from the disc 200 or 300 according to the present invention as set forth above in relation to FIGS. 3 through 4.

As described above, a high density read only optical disc according to an embodiment of the present invention does not require a laser with a short wavelength and a large numerical aperture of an objective lens. Also, the high density read only optical disc may obtain sufficient reflectivity by using a crystalline reading assist layer, may enhance the effect of the super-resolution structure, and is advantageous in terms of cost and number of processes, since an initialization operation for crystallization is not required.

However, it is understood that such short wavelength and/or large numerical aperture lenses may be used with the present invention.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A high density read only optical disc comprising:
   a substrate having pits formed thereon;
   a crystalline reading assist layer;
   a first dielectric layer; and
   a mask layer composed of a metal oxide.
2. The high density read only optical disc of claim 1, wherein the crystalline reading assist layer include at least one element of Sb and Te.

3. The high density read only optical disc of claim 2 in combination with a plasmon induced super-resolution structure which can read information recorded on said high density read only optical disc of claim 2.

4. The high density read only optical disc of claim 1, wherein the crystalline reading assist layer is composed of Sb or $Sb_2Te_3$.

5. The high density read only optical disc of claim 4 in combination with a plasmon induced super-resolution structure which can read information recorded on said high density read only optical disc of claim 3.

6. The high density read only optical disc of claim 1, wherein the metal oxide is $PtO_x$, $PdO_x$, $AuO_x$, $AgO_x$, or a mixture thereof.

7. The high density read only optical disc of claim 6 in combination with a plasmon induced super-resolution structure which can read information recorded on said high density read only optical disc of claim 4.

8. The high density read only optical disc of claim 1, further comprising a second dielectric layer between the substrate and the crystalline reading assist layer.

9. The high density read only optical disc of claim 8, wherein the dielectric layer comprises one of $ZnS$—$SiO_2$, $SiO_x$, $SiN_x$, $AlO_x$, or $AlN_x$, wherein x is a positive number.

10. The high density read only optical disc of claim 8 in combination with a plasmon induced super-resolution structure which can read information recorded on said high density read only optical disc of claim 5.

11. The high density read only optical disc of claim 1, wherein the metal oxide is $PtO_x$.

12. The high density read only optical disc of claim 11 in combination with a plasmon induced super-resolution structure which can read information recorded on said high density read only optical disc of claim 6.

13. The high density read only optical disc of claim 1, further comprising a third dielectric layer on the mask layer.

14. The high density read only optical disc of claim 13, wherein the dielectric layer comprises one of $ZnS$—$SiO_2$, $SiO_x$, $SiN_x$, $AlO_x$, or $AlN_x$, wherein x is a positive number.

15. The high density read only optical disc of claim 13 in combination with a plasmon induced super-resolution structure which can read information recorded on said high density read only optical disc of claim 7.

16. The high density read only optical disc of any one of claims 1, 8, and 13, wherein the dielectric layer is composed of $ZnS$—$SiO_2$, $SiO_x$, $SiN_x$, $AlO_x$, or $AlN_x$.

17. The high density read only optical disc of claim 16 in combination with a plasmon induced super-resolution structure which can read information recorded on said high density read only optical disc of claim 8.

18. The method of reading information recorded on a high density read only optical disc of any one of claims 1 comprising irradiating a laser beam with an appropriate power onto said disc to form surface plasmons on a super-resolution structure in order to read information recorded thereon.

19. The optical disc of any one of claims 1 through 16 in combination with a plasmon induced super-resolution structure which can read information recorded on said high density read only optical disc of claim 1.

20. The high density read only optical disc of claim 1, wherein the substrate comprises a material having a high transparency in a wavelength range of a recording laser, an effective impact resistance, heat resistance, environmental resistance, and is capable of being molded.

21. The high density read only optical disc of claim 1, wherein the substrate is one of: a polycarbonate, a polymethylmethacrylate, an epoxy, a polyester, an amorphous polyolefin, or a combination thereof.

22. The high density read only optical disc of claim 1, wherein the mask layer contains metal particles to function as a source of surface plasmons for super-resolution near-field optical recording.

23. The high density read only optical disc of claim 1, wherein the mask layer has a thickness of approximately 1.5 to 10.0 nm.

24. The high density read only optical disc of claim 1, wherein the substrate has a track pitch of approximately 0.74 µm.

25. A high density optical disc having a super-resolution near-field structure, comprising:
    a substrate having a plurality of pits formed thereon with different lengths in accordance with unit information;
    a crystalline reading assist layer formed on the substrate, to enhance the effect of the super-resolution near-field structure, while providing high reflectivity upon reading the unit information;
    a dielectric layer formed on the crystalline reading assist layer, to prevent diffusion; and
    a metal oxide mask layer formed on the dielectric layer, to form the effect of the super-resolution structure,
    wherein the layers are sequentially stacked on the substrate.

26. The high density optical disc of claim 25, further comprising:
    a second dielectric layer formed between the substrate and the crystalline reading assist layer; and
    a third dielectric layer formed on the mask layer.

27. The high density optical disc of claim 25, wherein the crystalline reading assist layer comprises Sb or $Sb_2Te_3$, and the metal oxide comprises $PtO_x$, $PdO_x$, $AuO_x$, $AgO_x$, or a mixture thereof, wherein x is a positive number.

28. The high density optical disc of claim 25, wherein the dielectric layer comprises one of $ZnS$—$SiO_2$, $SiO_x$, $SiN_x$, $AlO_x$, or $AlN_x$, wherein x is a positive number.

* * * * *

UNITED STATES PATENT AND TRADEMARK OFFICE
CERTIFICATE OF CORRECTION

| | | |
|---|---|---|
| PATENT NO. | : 7,172,798 B2 | |
| APPLICATION NO. | : 10/954362 | |
| DATED | : February 6, 2007 | |
| INVENTOR(S) | : Hwang et al. | |

It is certified that error appears in the above-identified patent and that said Letters Patent is hereby corrected as shown below:

The title page showing the illustrative figure should be deleted to be replaced with the attached title page.

UNITED STATES PATENT AND TRADEMARK OFFICE
CERTIFICATE OF CORRECTION

PATENT NO. : 7,172,798 B2
APPLICATION NO. : 10/954362
DATED : February 6, 2007
INVENTOR(S) : Hwang et al.

It is certified that error appears in the above-identified patent and that said Letters Patent is hereby corrected as shown below:

On the title page item (57), replace the Abstract with the following Abstract in its entirety:

--A high density read only optical disc includes a substrate having pits formed thereon; a crystalline reading assist layer; a first dielectric layer; and a mask layer that includes a metal oxide. The high density read only optical disc eliminates a need for a laser with a relatively short wavelength and reduces a need for an objective lens having a large numerical aperture.--

UNITED STATES PATENT AND TRADEMARK OFFICE
CERTIFICATE OF CORRECTION

PATENT NO. : 7,172,798 B2
APPLICATION NO. : 10/954362
DATED : February 6, 2007
INVENTOR(S) : Hwang et al.

Figure 2:
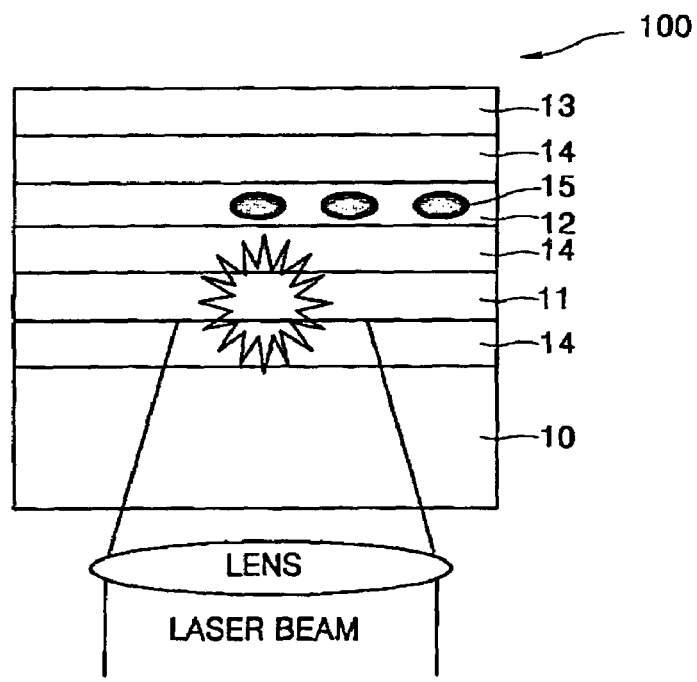
FIG. 2 schematically illustrates a structure and a recording principle of a conventional recordable optical disc using the super-resolution structure.

It is certified that error appears in the above-identified patent and that said Letters Patent is hereby corrected as shown below:

In the Drawings
Replace Figs. 1 and 2 with Figs. 1 and 2 shown below:

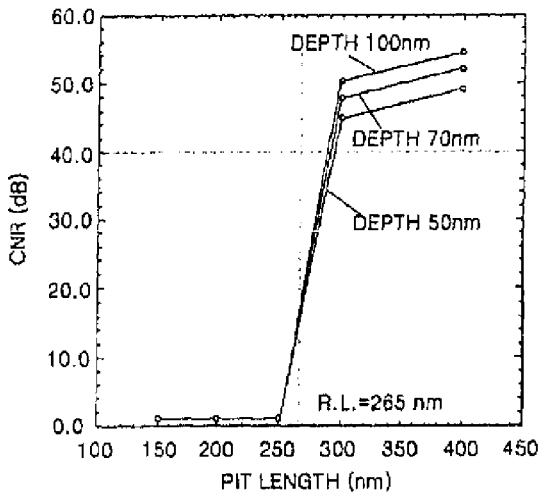

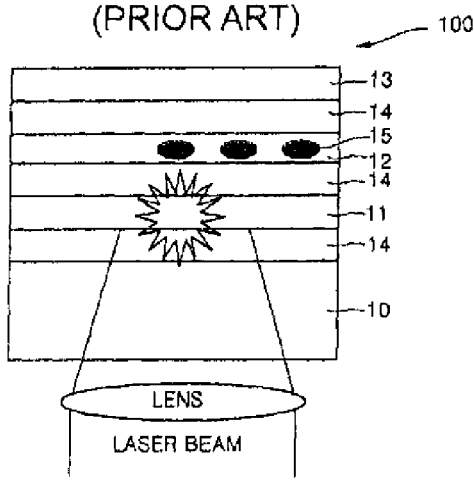

UNITED STATES PATENT AND TRADEMARK OFFICE
CERTIFICATE OF CORRECTION

PATENT NO. : 7,172,798 B2
APPLICATION NO. : 10/954362
DATED : February 6, 2007
INVENTOR(S) : Hwang et al.

It is certified that error appears in the above-identified patent and that said Letters Patent is hereby corrected as shown below:

Replace Claims 1-10 with the following claims 1-10:

--1. A high density read only optical disc having a super-resolution near-field structure, comprising:
a substrate having pits formed thereon;
a crystalline reading assist layer formed on the substrate to enhance the effect of the super-resolution near-field structure, while providing high reflectivity during a reading process; and
a first dielectric layer formed on the crystalline reading assist layer; and
a mask layer comprising a metal oxide, formed on the first dielectric layer,
wherein the layers are sequentially stacked on the substrate.

2. The high density read only optical disc of claim 1, wherein the crystalline reading assist layer includes Sb, Te, or a combination thereof.

3. The high density read only optical disc of claim 1, wherein the crystalline reading assist layer comprises Sb or $Sb_2Te_3$.

4. The high density read only optical disc of claim 1, wherein the metal oxide comprises $PtO_x$, $PdO_x$, $AuO_x$, $AgO_x$, or a mixture thereof, wherein x is a positive number.

5. The high density read only optical disc of claim 1, further comprising a second dielectric layer formed between the substrate and the crystalline reading assist layer.

6. The high density read only optical disc of claim 1, wherein the metal oxide comprises $PtO_x$, wherein x is a positive number.

UNITED STATES PATENT AND TRADEMARK OFFICE
CERTIFICATE OF CORRECTION

PATENT NO. : 7,172,798 B2
APPLICATION NO. : 10/954362
DATED : February 6, 2007
INVENTOR(S) : Hwang et al.

It is certified that error appears in the above-identified patent and that said Letters Patent is hereby corrected as shown below:

7. The high density read only optical disc of claim 1, further comprising a third dielectric layer formed on the mask layer.

8. The high density read only optical disc of claim 1, wherein the dielectric layer comprises one of $ZnS\text{-}SiO_2$, $SiO_x$, $SiN_x$, $AlO_x$, or $AlN_x$, wherein x is a positive number.

9. The method of reading information recorded on a high density read only optical disc of claim 1 comprising irradiating a laser beam with an appropriate power onto said disc to form surface plasmons on a super-resolution structure in order to read information recorded thereon.

10. The high density read only optical disc of claim 1 in combination with a plasmon induced super-resolution structure which can read information recorded on said high density read only optical disc of claim 1.--

Replace Claims 11-19 with the following claims 11-19:

--11. The high density read only optical disc of claim 5, wherein the dielectric layer comprises one of $ZnS\text{-}SiO_2$, $SiO_x$, $SiN_x$, $AlO_x$, or $AlN_x$, wherein x is a positive number.

12. The high density read only optical disc of claim 7, wherein the dielectric layer comprises one of $ZnS\text{-}SiO_2$, $SiO_x$, $SiN_x$, $AlO_x$, or $AlN_x$, wherein x is a positive number.

13. The high density read only optical disc of claim 2 in combination with a plasmon induced super-resolution structure which can read information recorded on said high density read only optical disc of claim 2.

14. The high density read only optical disc of claim 3 in combination with a plasmon induced super-resolution structure which can read information recorded on said high density read only optical disc of claim 3.

UNITED STATES PATENT AND TRADEMARK OFFICE
CERTIFICATE OF CORRECTION

| | |
|---|---|
| PATENT NO. | : 7,172,798 B2 |
| APPLICATION NO. | : 10/954362 |
| DATED | : February 6, 2007 |
| INVENTOR(S) | : Hwang et al. |

It is certified that error appears in the above-identified patent and that said Letters Patent is hereby corrected as shown below:

15. The high density read only optical disc of claim 4 in combination with a plasmon induced super-resolution structure which can read information recorded on said high density read only optical disc of claim 4.

16. The high density read only optical disc of claim 5 in combination with a plasmon induced super-resolution structure which can read information recorded on said high density read only optical disc of claim 5.

17. The high density read only optical disc of claim 6 in combination with a plasmon induced super-resolution structure which can read information recorded on said high density read only optical disc of claim 6.

18. The high density read only optical disc of claim 7 in combination with a plasmon induced super-resolution structure which can read information recorded on said high density read only optical disc of claim 7.

19. The high density read only optical disc of claim 8 in combination with a plasmon induced super-resolution structure which can read information recorded on said high density read only optical disc of claim 8.--

Signed and Sealed this

Seventh Day of April, 2009

JOHN DOLL
*Acting Director of the United States Patent and Trademark Office*

(12) United States Patent
Hwang et al.

(10) Patent No.: US 7,172,798 B2
(45) Date of Patent: *Feb. 6, 2007

(54) HIGH DENSITY READ ONLY OPTICAL DISC

(75) Inventors: In-oh Hwang, Yongin-si (KR); Joo-ho Kim, Suwon-si (KR); Hyun-ki Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/954,362

(22) Filed: Oct. 1, 2004

(65) Prior Publication Data
US 2005/0106351 A1 May 19, 2005

(30) Foreign Application Priority Data
Oct. 2, 2003 (KR) .............. 10-2003-0068611

(51) Int. Cl.
*B32B 3/02* (2006.01)

(52) U.S. Cl. ............ 428/64.4; 428/64.5; 428/64.6; 430/270.11

(58) Field of Classification Search ............ None
See application file for complete search history.

(56) References Cited

U.S. PATENT DOCUMENTS

| | | | |
|---|---|---|---|
| 6,312,780 B1* | 11/2001 | Kasami et al. | 428/64.1 |
| 6,741,549 B2* | 5/2004 | Tominaga et al. | 369/285 |
| 6,848,115 B2* | 1/2005 | Sugiura et al. | 720/719 |
| 6,896,946 B2* | 5/2005 | Chen | 428/64.1 |
| 2002/0154596 A1 | 10/2002 | Hsu et al. | |
| 2002/0160306 A1* | 10/2002 | Hanaoka et al. | 430/270.13 |
| 2002/0191527 A1 | 12/2002 | Kikukawa et al. | |
| 2004/0257968 A1* | 12/2004 | Kim et al. | 369/275.2 |
| 2005/0009260 A1* | 1/2005 | Kim et al. | 438/202 |
| 2005/0079313 A1* | 4/2005 | Kim et al. | 428/64.4 |

FOREIGN PATENT DOCUMENTS

| | | |
|---|---|---|
| JP | 2000-285536 | 10/2000 |
| JP | 2002-074666 | 3/2002 |

* cited by examiner

*Primary Examiner*—Bruce H. Hess
(74) *Attorney, Agent, or Firm*—Stein, McEwen & Bui, LLP

(57) ABSTRACT

A high density read only optical disc is provided. The high density read only optical disc includes a substrate having pits formed thereon; a crystalline reading assist layer; a first dielectric layer; and a mask layer composed of a metal oxide. The high density read only optical disc does not require a laser with a short wavelength or a large numerical aperture of an objective lens.

28 Claims, 4 Drawing Sheets

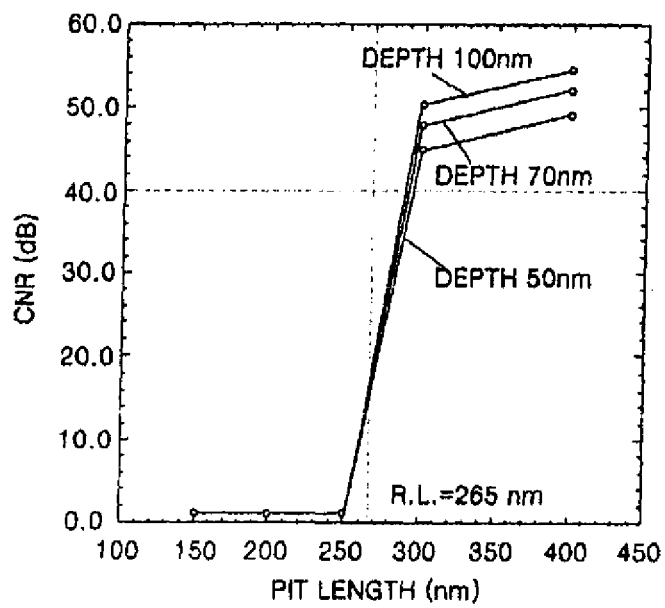

(PRIOR ART)